May 26, 1970  G. STRÖKER  3,513,995
STORAGE ARRANGEMENT
Filed May 15, 1968  2 Sheets-Sheet 2
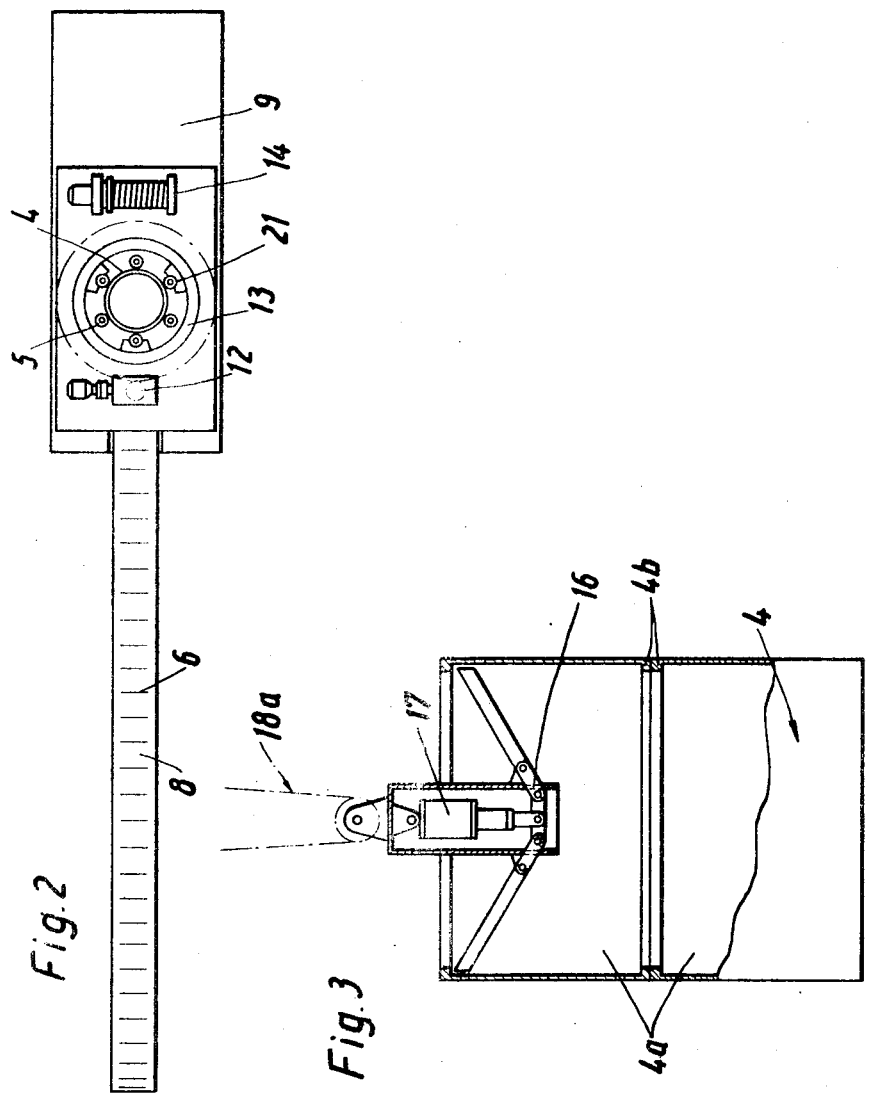
Inventor:
Günter Ströker

United States Patent Office 3,513,995
Patented May 26, 1970

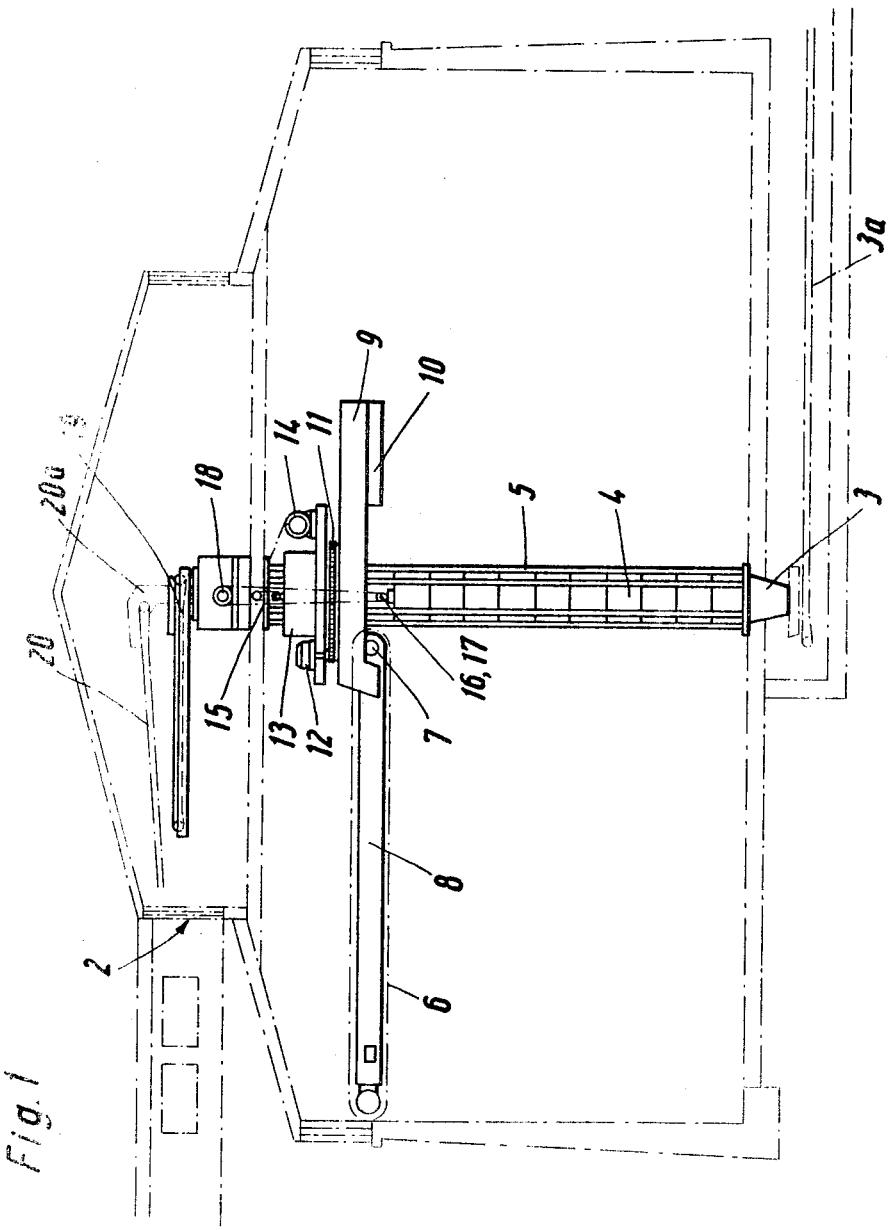

---

3,513,995
STORAGE ARRANGEMENT
Günter Ströker, Holzwickede, Germany, assignor to
Gustav Schade, Dortmund-Schuren, Germany
Filed May 15, 1968, Ser. No. 729,263
Int. Cl. B65g 65/38
U.S. Cl. 214—17          6 Claims

ABSTRACT OF THE DISCLOSURE

A housing defines an upright chamber which is adapted to accommodate flowable material. The upper end of the housing is provided with an inlet and the lower end is provided with an outlet. An elongated tubular chute is arranged in the center of the housing extending from the upper to the lower end. An elongated conveyor is carried by the chute and extends transversely thereof. The conveyor is turnable about the chute and can be moved lengthwise of the chute in upward and downward direction.

BACKGROUND OF THE INVENTION

The present invention relates to the storage of flowable materials, and more particularly to a storage arrangement for such materials.

It is known to store flowable materials, such as granulated sugar, salt, pulverulent or granulated chemicals and the like, in silos, which is to say in large receptacles defining an internal upright chamber. Of course, the material must not only be introduced into such a silo, but must also be subsequently again removed therefrom. As flowable material is introduced into these known silos, it will tend to form peaks and valleys, mounds or similar configurations. To provide an even filling of the silos, that is to provide an even level of the flowable material in the silo, and also to remove the material subsequently from the silo evenly and layer by layer, it is known to provide devices which in effect rake the material. Such devices are usually mobile and sometimes are mounted on tracks in the silo. This is particularly disadvantageous if the silo is of polygonal cross-sectional configuration because these devices move along the floor of the silo and thus present a definite limitation to the quantities of material which can be stored in the interior of the silo. Furthermore, there exists frequently the danger that the device and its operator may be buried under the flowable material if too much material is introduced into the silo, or if any of the peaks resulting from rapid introduction of material into the silo are allowed to grow to a level significantly higher than the device in question. Furthermore, where the device is of the type which utilizes rails, it is of course usually necessary to free the rails from flowable material covering them before the device can be moved along the rails from one position to another.

For these and other reasons, it will be appreciated that an improvement in the storage and removal of flowable materials under the just outlined conditions has long been sought.

It is therefore a general object of the present invention to provide a device of the type under discussion which is not subject to the disadvantages set forth above.

More particularly it is an object of the present invention to provide a storage arrangement for the storage of flowable materials which is rather simple in its construction, which is highly effective in operation, and which permits maximum utilization of available storage space as well as maximum effectiveness of storage and retrieval of the stored material.

SUMMARY OF THE INVENTION

In accordance with one feature of my invention I provide a storage arrangement for storing flowable materials which comprises a housing defining an upright chamber which is adapted to accommodate flowable material such chamber having an upper end provided with an inlet and a lower end provided with an outlet. Elongated support means is arranged substantially centrally in the chamber and extends between the ends thereof. An elongated material conveyor is carried by and extends transversely to the support means. First means is operatively associated with the conveyor for effecting movement of the same about the support means and for displacing material in the chamber substantially radially of the support means. Finally, second means is provided and is operatively associated with the conveyor for effecting movement thereof in the direction of elongation of the support means whereby the conveyor is adjustable to different levels of material accommodated in the chamber.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 1 is a somewhat diagrammatic vertical section through a storage arrangement incorporating my invention;

FIG. 2 is a top-plan view of a portion of the arrangement illustrated in FIG. 1; and FIG. 3 is a partial detail view of the embodiment illustrated in FIG. 1.

DESCRIPTION OF THE PREFERRED EMBODIMENTS

Discussing now the drawing in detail, and firstly FIG. 1 thereof, it will be seen that I provide a housing or silo which is identified with reference numeral 1 and which in the illustrated embodiment is of circular outline. It is clear, of course, that a cross-sectional outline other than circular, for instance polygonal, is equally feasible. For the sake of clarity I have chosen to illustrate the housing 1 in phantom lines so as not to detract from the showing of the other components which must be envisioned as being located in the center of the circular housing 1.

At the upper portion of the housing 1, the same is provided with an inlet 2 and at the lower portion it is provided with an outlet 3. A conveying arrangement, whose particular construction is of no concern for the purposes of the present invention, is identified with reference numeral 20 and serves to convey flowable material through the inlet 2 into the interior of the housing 1. Arranged centrally of the housing 1 so as to have its lower end in communication with the outlet 3 of the housing, is a vertical tubular conduit 4 which in the illustrated embodiment consists of a plurality of stacked tube sections 4a, as is clearly visible in FIG. 3. These tube sections 4a may be provided at their engaging end faces with suitable sealing means, for instance in form of sealing rings 4b (compare FIG. 3) to provide a tight seal between the adjacent sections 4a. The conduit or tube 4 may also be thought of as a chute. In the illustrated embodiment it is surrounded by a frame in form of a plurality of vertical bars 5 which are angularly spaced about the conduit 4, as is evident particularly from FIG. 2.

A carriage 13 is mounted on the support 5 and in turn carries a member 9 which is rotatable about the vertical axis defined by the support 5 and the conduit 4. The member 9 has mounted thereon a conveyor in form of an arm 8 which carries a material-advancing member 6, for instance a belt or chain provided with flights or similarly projecting portions which, when the member 6 moves endlessly in the longitudinal direction of the arm 8, will engage flowable material in the interior of the housing 1 and will move it substantially radially of the support 5. It is clear, of course, that movement of the member 6, which hereafter will be designated as the chain 6, may be in one direction only, or that such movement may be reversible periodically or at the will of the user. The drive means for the chain 6 is identified with reference numeral 7 and may be of any well known type so that it requires no specific discussion. To counterbalance the weight of the arm 8 the member 9 carries at the side which is diametrally opposed to the arm 8 a counterweight 10.

Suitable actuating means 12 are provided which effect turning movement of the member 9 and thereby the arm 8 carried thereby, about the axis defined by the support 5. Such actuating means 12 may be of many different types and are so well known to those skilled in the art that they are not believed to require specific discussion. This is also true of the lifting device 14, which may be a suitable electromotor or the like, and which cooperates with a conventional pulley arrangement 15 by means of which the carriage 13 may be lifted and lowered in the housing 1, that is lengthwise of the guide means 5. For this purpose the carriage 13 is mounted on the individual bars constituting the guide means 5 via glide shoes 21 in the manner which is well known from the art. Finally, there is provided a drive means 18, which is connected via a suitable connecting arrangement 18a of well known construction with an engaging arrangement for engaging individual ones of the sections 4a of the tubular conduit 4. This is illustrated in FIG. 3 where this arrangement will be seen to comprise pivotable fingers or arms 16 which can engage suitable shoulders, projections or other instrumentalities provided for this purpose on the sections 4a, these fingers or arms 16 being moved radially outwardly or retracted radially inwardly by means of a control mechanism 17. This also is known in the art. The purpose of this arrangement is to permit lifting of any one of the sections 4a, regardless of how many others of the sections 4a may be supported atop the particular section which is to be lifted. The arrangement 18a controls operation of the device 17.

As flowable material is introduced through the inlet 2, into the interior of the housing 1 by means of the conveyor 20, it falls from the conveyor 20 into a funnel or otherwise shaped conduit 20a which is shown in phantom lines in FIG. 1, and from there issues onto a suitable distributor. In the illustrated embodiment, and as shown in FIG. 1, this distributor is assumed to be a conveyor 19 which is located upwardly of the arm 8 and which in this embodiment has a length corresponding to substantially one half of the length of the arm 8. As the conveyor operates and also rotates about the axis constituted by the support means, suitable connections being affected between the conveyor 19 and the carriage 13, material will continuously issue from the free end of the conveyor 19 and drop into the interior of the housing 1. Because the conveyor 19 also rotates the material will form what amounts to a ringmount first on the floor of the housing 1 and subsequently on top of whatever material already covers this floor. To eliminate this ringmount, which is not illustrated in the drawing, the arm 8 is lowered and, as the arm 8 rotates while the chain 6 advances in an endless path or reciprocates in opposite directions, the ringmount is leveled off so as to provide a smooth and level surface of the material in the housing 1. This makes it possible to fill the interior of the housing 1 to maximum capacity because it permits utilization of the entire volume of the interior.

When the process is subsequently to be reversed, that is when material is to be withdrawn from the housing 1, the device 16–18 is utilized to initially lift the uppermost section 4a of the conduit 4 off the next-lower section. This results in the formation of a gap between the two sections and, as the arm 8 again rotates about the support 5 with simultaneous advancement of the chain 6, the uppermost layer of material in the housing 1 is advanced radially inwardly towards and into this gap so that it enters into the interior of the conduit 4 through which it falls into the outlet 3 of the housing 1. Once the uppermost layer has been removed, the uppermost section 4a is allowed to descend until it again rests on the next-lower section. Thereupon the next-lower section is engaged by the device 16–18 and and both of these sections are now lifted so that a new gap develops between the second and third sections. The process of material removal is now repeated, and another section is lifted to open an additional gap. This continues until all the material in the housing 1, or that quantity of the material which is desired to be withdrawn, has been conveyed into the interior of the conduit 4 and from there into and through the outlet 3. A suitable conveying arrangement 3a, illustrated in diagrammatic form and in phantom lines in FIG. 1 is provided for conveying the material issuing from the outlet 3 to the point of use, such as a weighing station, packaging station or the like.

It is clear that a variety of modifications of the illustrated exemplary construction is possible without departing in any way from the concept of the present invention. Thus, two or more arms 8 with their associated chains 6 can be provided to increase the operational capabilities of the device. In fact, this may permit elimination of the conduit 10 because two such arms could counterbalance each other. In certain circumstances it may also be desirable to make the arm 8 tiltable so that it can be moved from its normal operating position, which is illustrated in FIG. 1 and in which it extends substantially horizontally and transversely of the elongation of the conduit 4 and the support means 5 to another position, either upwardly or downwardly and in which it either extends in parallelism with the conduit 4 and the support means 5 or is inclined thereto at an angle different from the one illustrated in FIG. 1. This is not illustrated but the possibility and the structural solutions will be readily evident to those skilled in the art.

This is also true of another possible embodiment according to which the conduit 4 consisting of the individual sections 4a is replaced by a single tube having provided therein a plurality of apertures located at least one each on different levels, and provided with doors sliding gates or similar expedients for selectively opening and closing these apertures. The device 16–18 would then be replaced by suitable means for opening and closing any or all of the doors or sliders individually or simultaneously. Ordinarily only that door would be opened which would establish communication through the associated aperture between the interior of the housing 1 and the interior of the tube on that level of the housing 1 from which material is to be removed at the time, that is the level at which the arm 8 is located at that time.

Another possibility consists in substituting for the conduit 4 two coaxial tubes which are each provided with apertures. The device 16–18 would then be replaced with a suitable arrangement permitting rotational movement of at least one of these tubes with reference to the other between a position in which all of the respective openings are out of registry and a plurality of other positions in which any or all of the openings in the respective inner and outer coaxial tubes are in registry with one another. Ordinarily, the operation would again be such that the tubes would be turned until those apertures of the inner and outer tubes would be in registry with one another which are located on that level from which material is to be removed at the time, that is the level at which the arm 8 is located at that time.

It is clear that the cross-sectional configuration of the conduit 4, or of any element or elements which are substituted for this conduit 4, may be circular or that it may be of other-than-circular outline. It will also be understood that a suitable insert can be provided within the conduit 4 or any substitute therefor which would provide a slide of helical or other type for the material admitted into the interior, such slide extending to the outlet 3. In the illustrated embodiment each of the sections 4a could carry an insert constituting a portion of such slide and defining with the other inserts of the other sections 4a the totality of the slide. Thus, the beginning of the slide would be located at which ever gap is opened by lifting one section 4a from the next lower section 4a, and from this gap the slide would then lead to the outlet 3 of the housing 1.

It will be understood that each of the elements described above, or two or more together, may also find a useful application in other types of constructions, differing from the types described above.

While the invention has been illustrated and described as embodied in a storage arrangement for storing flowable materials, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention.

What is claimed as new and desired to be protected by Letters Patent is set forth in the appended claims.

What is claimed is:

1. A storage arrangement for storing flowable materials, comprising, in combination, a housing defining an upright chamber adapted to accommodate flowable material, and having an upper end provided with an inlet and a lower end provided with an outlet; elongated hollow support means arranged substantially centrally in said chamber and extending between said ends, said support means being composed of relatively movable tubular sections and having a lower end communicating with said outlet; an elongated material conveyor carried by and extending transversely to said support means; first means operatively associated with said conveyor for displacing material in said chamber substantially radially of said support means; second means operatively associated with said conveyor for effecting movement of the same in directions of elongation of said support means whereby said conveyor is adjustable to different levels of material accommodated in said chamber; and operating means for effecting relative movement between respective sections of said support means in a sense establishing communication between said chamber and the interior of said support means to enable transfer of flowable material from the former to the latter.

2. An arrangement as defined in claim 1, wherein said chamber is of circular cross-section.

3. An arrangement as defined in claim 1, wherein said conveyor comprises an elongated material advancing member; said first means comprising drive means for effecting movement of said conveyor about said support means, and for longitudinally advancing said elongated material-advancing member transversely of said support in direction towards and away from the same.

4. An arrangement as defined in claim 3, wherein said support means comprises a tubular chute having said lower end communicating with said outlet.

5. An arrangement as defined in claim 4, wherein said support means comprises frame means surrounding said chute and carrying said conveyor, and wherein said chute consists of a plurality of stacked adjoining chute sections guided by said frame means for movement lengthwise of said support means; and wherein said operating means is associated with said chute and operable for effecting movement of any of said chute sections away from an adjoining section to thereby establish an aperture therebetween and effect communication of said chamber with the interior of said chute.

6. An arrangement as defined in claim 5, wherein said support means comprises frame means surrounding said chute; and further comprising a carriage supported on said support means for rotation thereabout and for movement lengthwise thereof, said conveyor being mounted on said carriage.

References Cited
UNITED STATES PATENTS

| 772,911 | 10/1904 | Acklin | 214—17 |
| 2,649,215 | 8/1953 | Dickson | 214—17 |
| 2,863,576 | 12/1958 | Trask | 214—17 |
| 3,358,856 | 12/1967 | Weibull | 214—17 |

FOREIGN PATENTS

| 566,325 | 12/1932 | Germany. |

ROBERT G. SHERIDAN, Primary Examiner